United States Patent
Carew et al.

[11] Patent Number: 5,904,174
[45] Date of Patent: *May 18, 1999

[54] AUXILIARY TAP VALVE

[75] Inventors: Michael David Carew, Balwyn; Stephen James Lennie, Warranwood, both of Australia

[73] Assignee: Lanworth Asia Limited, British Virgin Islands, Virgin Islands (Br.)

[ * ] Notice: This patent issued on a continued prosecution application filed under 37 CFR 1.53(d), and is subject to the twenty year patent term provisions of 35 U.S.C. 154(a)(2).

[21] Appl. No.: 08/571,963
[22] PCT Filed: Jun. 23, 1994
[86] PCT No.: PCT/AU94/00341
§ 371 Date: Dec. 28, 1995
§ 102(e) Date: Dec. 28, 1995
[87] PCT Pub. No.: WO95/00789
PCT Pub. Date: Jan. 5, 1995

[30] Foreign Application Priority Data

Jun. 28, 1993 [AU] Australia ................. PL 9679

[51] Int. Cl.[6] .................................................. F16L 29/02
[52] U.S. Cl. ........................................ 137/329.2; 251/118
[58] Field of Search ................. 137/614.21, 801, 137/614, 329.1, 329.2; 251/118, 124, 123

[56] References Cited

U.S. PATENT DOCUMENTS

| | | |
|---|---|---|
| 104,663 | 6/1870 | Tilly . |
| 202,639 | 4/1878 | Elliott . |
| 624,855 | 5/1899 | Parkes et al. . |
| 1,082,988 | 12/1913 | Wolff . |
| 1,123,801 | 1/1915 | Robinson . |
| 1,190,530 | 11/1915 | Engel . |
| 1,200,268 | 10/1916 | Taggart . |
| 1,242,864 | 10/1917 | Ricks . |
| 1,401,879 | 12/1921 | Comings ................... 137/614.21 X |
| 1,437,136 | 11/1922 | Freer ....................... 137/614.21 X |
| 1,605,262 | 11/1926 | Midgley et al. . |
| 1,610,474 | 12/1926 | Richter . |
| 1,831,414 | 11/1931 | Hamilton et al. . |
| 2,158,566 | 5/1939 | Bamberger ................. 137/329.2 X |
| 2,845,003 | 7/1958 | Thomas . |
| 3,262,465 | 7/1966 | Gillberg . |
| 3,405,729 | 10/1968 | Young et al. ............... 137/329.2 |
| 4,763,687 | 8/1988 | Arth et al. ................. 251/118 X |
| 5,110,088 | 5/1992 | Shih ....................... 137/329.2 X |

FOREIGN PATENT DOCUMENTS

| | | | |
|---|---|---|---|
| 169702 | 9/1991 | China . | |
| 22472 | 10/1902 | Germany | ................. 137/614.21 |
| 5284 | 12/1889 | United Kingdom | ........ 137/614.21 |

OTHER PUBLICATIONS

Search Report.

*Primary Examiner*—Kevin Lee
*Attorney, Agent, or Firm*—Pillsbury Madison & Sutro Intellectual Property Group

[57] ABSTRACT

An auxiliary tap valve insertable into a fluid flow path of a tap is disclosed. The auxiliary tap valve includes a sleeve body with an auxiliary valve seat member, and an auxiliary valve member. The sleeve body has at least one constriction for restricting fluid flow through the auxiliary tap valve. The auxiliary valve member is supported within said sleeve body and operatively connectable to a main valve member of the tap to be movable between open and closed positions to open and close the auxiliary tap valve to fluid flow. The auxiliary valve member has a substantially-flat chamfered first face and a conical second face respectively facing downstream and upstream relative to fluid flow through the tap. In operation, fluid flow through said constriction is restricted to create a venturi pressure drop downstream across said auxiliary valve member. The venturi pressure and lift created by fluid flow against differential surface areas of the first and second faces collectively urge the auxiliary valve member toward the auxiliary valve seat member during fluid flow through the auxiliary valve member to reduce turbulence clatter.

13 Claims, 2 Drawing Sheets

AUXILIARY TAP VALVE

This application claims benefit of international application PCT/AU94/00341, filed Jun. 23, 1994.

BACKGROUND OF THE INVENTION

1. Field of the Invention

This invention relates to tap cocks and stop valves and in particular to an auxiliary tap valve either for retrofit or built in incorporation into screw down acting taps and valves for controlling fluid or water flow by automatically shutting off the flow of water through a tap during maintenance and reducing operating water flow to assist in water conservation.

2. Description of the Related Art

A vast array of valves, cocks and taps exist for controlling the flow and delivery of liquids and gases.

Such devices vary from the simple plug cocks which provide a transverse plug to interrupt the flow of a gas or liquid in a supply line, where the plug is provided with a hole capable of rotational alignment with the input and output supply lines to effect control over the flow of gases and liquids, to complex sluice valves involving a number of components.

For the supply and control of water, in particular to domestic situations, a screw down stop valve is commonly incorporated into a tap cock such that a washer is made to bear down on an orifice through which water passes. Such devices fall midway between simple plug cocks and complex valves and find extensive application in the control of water supply.

The screw down stop valve provides a screw operated spindle as an activating means for the washer such that a high degree of control can be exercised over the washer and therefore over the flow of water through the orifice. Such screw down stop valves are commonly known as bib cocks and find wide application in domestic water control.

The bib cock provides a body through which water passes via an internal gate which is opened and closed by the screw action of a spindle urging a washer against the seat of an orifice in the gate to close off the water supply. However, if the washer fails or wears out, as they are bound to do, it is necessary to arrest the supply of water to the tap in question before the washer can be removed and replaced.

The requirement for shut down of a water supply prior to maintenance can often cause great inconvenience or danger to other users or systems fed from a common source. For example, in a block of flats or apartments it is often necessary to interrupt the water supply to the whole block in order to fix one tap. In a commercial situation, if a water tap requires maintenance it can be time consuming and often difficult to locate the site of a mains water control tap. In addition, industrial situations may require a constant supply of water or other liquids which cannot be interrupted until the end of a shift or run. If a tap is faulty in such a situation it may be impossible or very difficult to interrupt the mains supply in order to service the faulty tap.

A number of devices have been proposed to finction as intermediate valves in the above described situation.

For example, Australian Patent Application No. 59752/80 discloses a valve assembly to enable repair work to be performed without having to shut off the water supply. Similarly Australian Patent Application No. 70219/74 discloses an improved fluid valve involving a complex arrangement of valve members and springs adapted to close off the main water supply to a tap to facilitate maintenance.

The currently available devices operate in one of two ways;

a) either by a positive bias of the auxiliary valve in the form of a mechanical element like a spring which urges the valve closed; or, b) by a passive action relying on the back pressure supplied by the fluid stream itself which actuates the valve and urges it into the closed position by following the direction of flow of the fluid.

The current devices which operate on either of the above systems suffer numerous serious drawbacks. The positively biased devices are totally dependent for their reliability on a spring which can fail and require major maintenance. Furthermore, such spring devices involve complicated manufacture and assembly and corresponding high costs as well as a limitation on the retrofittability of such mechanisms.

On the other hand passive devices that rely on the back pressure supplied by the flow of fluid in the direction from the fluid supply (upstream) through the top gate to the outlet (downstream) to close the valve also suffer problems; principally in the smooth and positive operation of the valve which can suffer if any turbulence is caused in the gate area of a tap. In particular, unless the valve is very specifically placed within the tap gate, the back pressure of the fluid may not be uniformly or positively applied to the underface or upstream face of the valve so as to push the valve closed, but may also be applied to the upper face of the valve and cause a counteracting force to keep the valve open. The resultant forces on the valve can cause excessive clatter and efficient operation.

OBJECT AND SUMMARY OF INVENTION

One object of this invention is to provide an improved tap valve adapted to solve some of the foregoing problems.

Accordingly, the invention provides an auxiliary tap valve comprising a sleeve body with an auxiliary valve seat member and an auxiliary valve member supported within said sleeve body to be engageable with the auxiliary valve seat member to close the fluid flow through the valve. The auxiliary tap valve is adapted for inter-engagement with the flow passage of a tap such that the auxiliary valve member is activated to open by the main valve member of the tap. The auxiliary valve member has a first face substantially facing downstream of the fluid flow and a second face substantially facing upstream of the fluid flow such that the second face has a greater surface area exposed to the fluid flow than the first face. The sleeve body has a restriction to constrict and limit the flow of fluid through the valve such that the combined venturi pressure drop on the downstream side of the auxiliary valve in conjunction with lift created by the differential surface areas of the first and second faces of the auxiliary valve urge the auxiliary valve toward the main valve during fluid flow, thereby urging the auxiliary valve to close, reducing turbulence clatter, and providing a positive operation of the valve.

The second face of the auxiliary valve member is preferably conical in shape with a flat profile and the first face is substantially flat such that not only does the upstream fluid flow across the conical face assist in providing a positive lift to the valve but the contemporaneous downstream fluid flow over the flat face provides a suction or negative lift acting in the same direction as the positive lift from the other side.

In addition, the sleeve body has constrictions or restrictions in the form of passageways in the sleeve body through which fluid must pass to traverse the taps gate.

The passageways may be of varying size and configuration in order to provide an optimal venturi effect to suck up the auxiliary valve as a result of the pressure drop across the sleeve body. In addition, the size of the passageways can be adjusted to compensate for local water pressure and assist in water conservation.

The passageways are preferably formed in the spider of the sleeve body around a central hole used to support the stem of the auxiliary valve member.

The passageways preferably adopt a semicircular shape as a pair substantially surrounding the stem of the auxiliary valve member. The passageways may be tapered in an orientation aligned with the flow of fluid through the sleeve body in the form of a part frustro conical shape with the broadest part of the passageways being upstream of the water flow such that the passageways form a substantially coaxial frustro conical opening in the spider of the sleeve body bridged by a traversing bar within which is housed the stem of the auxiliary valve.

The main valve member is most preferably a standard tap washer and is adapted to engage the auxiliary valve member by bearing down upon it during the normal operating action of the tap.

The valve is preferably sized to allow it to be optionally retrofitted into an existing standard tap by passing through the hole made available by removing the spindle bearing and seal. The valve may also be prebuilt or manufactured de novo into a new tap.

BRIEF DESCRIPTION OF THE DRAWINGS

The invention will now be described in greater detail by reference to the following drawings where:

FIGS. 3–5 show a cross-section of a standard tap incorporating the auxiliary tap valve wherein FIG. 3 shows the normal closed position of the standard tap valve;

FIG. 4 shows the normal part open position of the standard tap valve;

FIG. 5 shows the full open position of the standard tap with the auxiliary valve member arresting the flow of fluid.

DETAILED DESCRIPTION OF THE INVENTION

Figure 1:
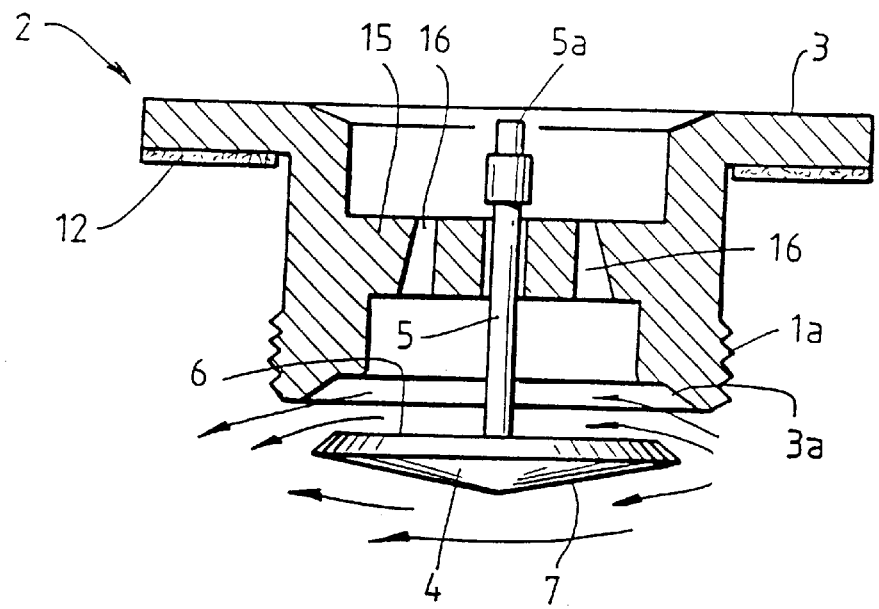
FIG. 1 shows a cross-section of the auxiliary tap valve.

Referring to FIG. 1, the invention shall be described in the retrofit form of the auxiliary valve. The auxiliary tap valve can be seen to comprise a sleeve body 2 having an optional external thread 1a to facilitate retro fitting of the valve into the body of a tap. The auxiliary valve may alternatively be manufactured de nova and incorporated into a new tap design such that the external thread would not be required. The sleeve body may be provided with a substitute main valve seat member 3 adapted to receive and sealably abut a main valve member (not shown). The sleeve body is further provided with an auxiliary valve seat member 3a positioned opposite the main valve seat member, such that, upon fitting into a tap body the main and auxiliary valve seat members are positioned either side of the taps flow passage or internal gate 13 (see FIG. 3). The valve is further provided with an auxiliary valve member 4 supported co-axially within the sleeve body. The auxiliary valve member comprises a stem 5, a first face 6 of substantially flat configuration facing downstream or away from the water flow; and a second face 7 of a conical configuration facing upstream or toward the water flow; wherein the auxiliary valve member is free to move axially from an open position allowing free, albeit restricted movement of fluid through the sleeve body to a closed position where the first face 6 of the valve abuts the auxiliary valve seat member 3a and closes the valve. The first face 6 may incorporate a chamfered edge to assist in the snug fitting to the seat. The top extension of the stem 5a is positioned to allow interaction with the main valve member. The underside of the main valve seat member 3 may be provided with a fiber or other type of washer 12 to ensure a fluid tight seal with the internal gate of the tap.

The sleeve body 2 may be a substantially solid construction provided with a central spider 15 to accommodate the valve stem 5 and apertures 16 to provide a passageway for fluid travel through the valve.

The apertures may be varied to permit differing levels of flow restriction and it is the restriction of flow through the apertures that provides a drop in local fluid pressure immediately downstream from the auxiliary valve such that the auxiliary valve member has suction applied thereto urging it to close. In addition, the high upstream pressure also urges the auxiliary valve to close against the main valve.

The apertures are constructed in the spider of the sleeve body as reducing or tapering semi-circular holes surrounding the auxiliary valve stem 5. The apertures have a part conical shape where the reduction of water flow provided by the apertures is enhanced by the reducing size of the apertures as they pass through the thickness of the spider. The so formed reducing apertures provide for an acceleration of the flow of water to the downstream side of the valve which results in a pressure drop immediately behind the valve. The pressure drop facilitates the "sucking up" of the auxiliary valve member toward the closed position and thereby urges the valve to bear solidly onto the main valve by way of the stem extension 5a. In addition, the semi-circular configuration of the apertures (seen in FIG. 2), further enhances the smooth flow of water through the valve by minimizing turbulence. In this manner, the valve design provides a first means of improving the passive closing action of this auxiliary valve.

Furthermore, the differential configuration of the upstream face 7 and the downstream face 6 of the auxiliary valve member is such that a greater surface area is exposed to the upstream fluid flow, which also has a greater pressure than the downstream fluid flow. The greater surface area in conjunction with the higher pressure ensures that the valve is constantly pushed up to and against the main valve while the main valve is open. The constant urging of the valve against the main valve ensures that the valve does not clatter about under any turbulence that may be created at the gate opening as fluid passes through the valve.

Figure 2:
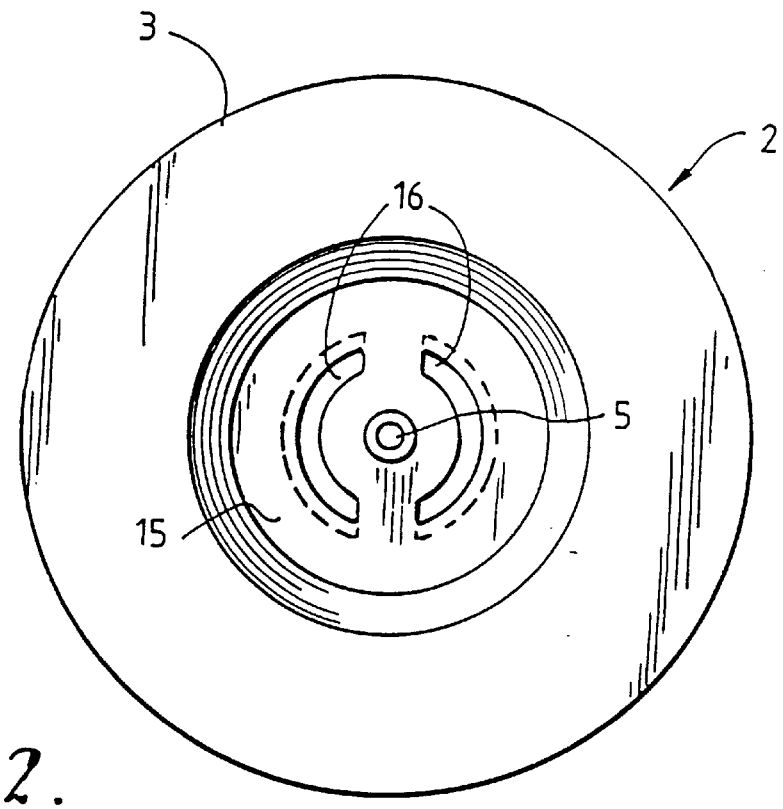
FIG. 2 shows a plan view of the auxiliary tap valve.

FIG. 2 shows a plan view of the auxiliary valve with the apertures 16 showing the restriction to fluid flow. The size and configuration of the apertures may be varied according to the amount of flow restriction required. The semicircular configuration around the stem 5a provides an enhanced smoothness and reduced turbulence in the operation of the valve.

FIGS. 3, 4, 4a and 5 detail the auxiliary tap valve in three progressive stages of operation as fitted to a standard tap to make up an auxiliary valve device. The auxiliary tap valve may be prefitted and incorporated into the gate design of a new tap or retrofitted to an existing tap.

Figure 3:
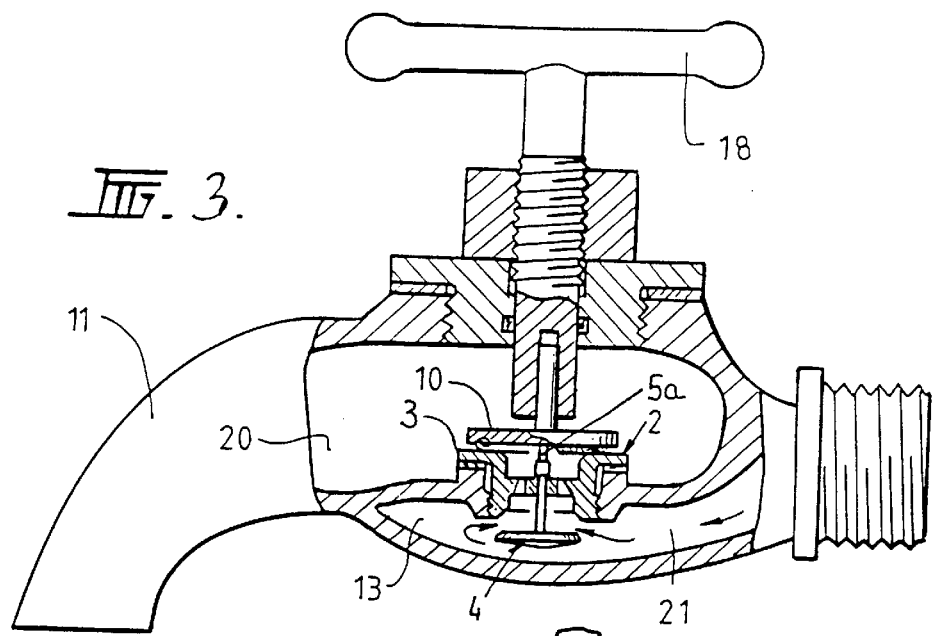

Referring to FIG. 3, a standard tap 11 can be seen in the "off" position with the main valve member 10 of the tap 11 shut down so as to engage the main valve seat member 3 and seal off the flow passage or gate 13 of the tap. In this position, the main valve member has fully depressed the auxiliary valve member 4, by co-operation with the top extension 5a of the auxiliary valve member 4. The auxiliary valve at this stage has no operational effect at all.

Figure 4A:
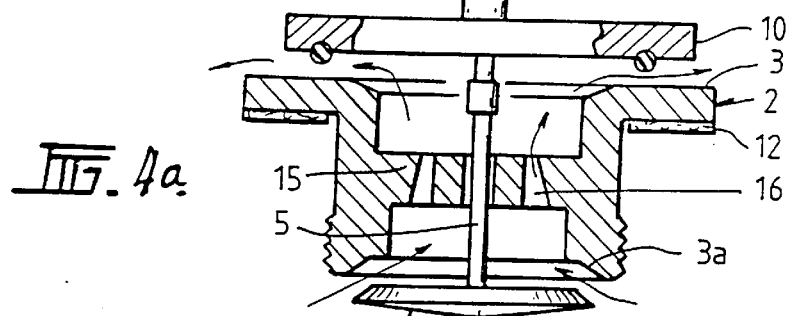
FIG. 4a show detail of the auxiliary tap valve during normal part open position of the tap.
Figure 4:
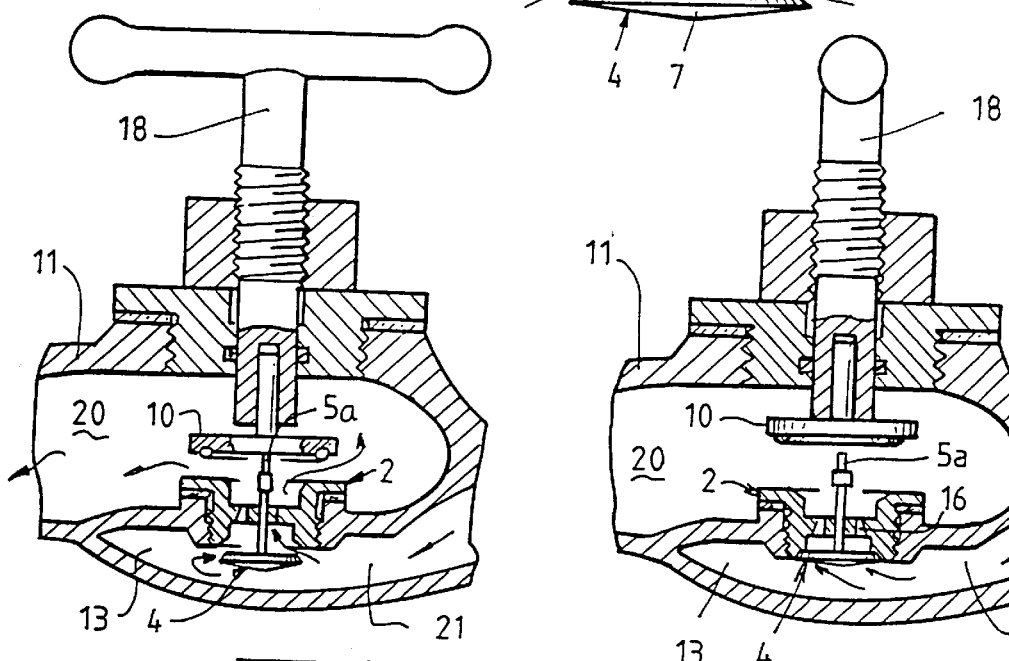

FIGS. 4 and 4a detail the standard tap with the main valve member 10 partially open as in normal operation to allow fluid flow through the valve and tap body.

In this mode of operation the main valve member 10 of the tap is opened up by turning on the tap handle 18 such that the main valve member 10 lifts off the main valve seat member 3. Upon opening of the main valve member, the fluid begins to move through the valve from the upstream to the downstream and in so doing converges on to the constriction formed in the gate 13 by the auxiliary valve body 1 and the apertures 16. The restriction of the fluid flow causes a drop in pressure of the fluid downstream of the auxiliary valve (downstream fluid 20) as compared to the pressure of the fluid upstream of the auxiliary valve (upstream fluid 21). The difference in pressure in the two areas immediately surrounding the auxiliary valve causes a venturi effect which results in the auxiliary valve being sucked up into the gate 13 and thereby being pushed against the main valve member 10. In addition to this effect the particular configuration of the face of the auxiliary valve is such that the face of the auxiliary valve in contact with the upstream flow of fluid, the second or upstream face 7, has a conical shape of greater surface area than the other side of the face, the first or the downstream face 6. The greater surface area of the second face in conjunction with the conical shape cause the flow of fluid past the auxiliary valve to lift the auxiliary valve up so as to further increase the pressure of the auxiliary valve onto the main valve 10. The combined action of the venturi suction effect and the physical lift of the fluid flow ensure that the auxiliary valve is held snugly against the main valve member 10 and does not clatter about or have any tendency to "fall down" as a result of turbulence.

In this mode of "normal" operation, the auxiliary valve is serving the function of reducing water flow through the tap and thereby providing a means of conserving water. The degree of restriction to water flow offered by the apertures 16 can be varied to provide greater reduction in areas of high water flow or pressure and can be enlarged to limit restriction in areas of low water flow or pressure.

Figure 5:
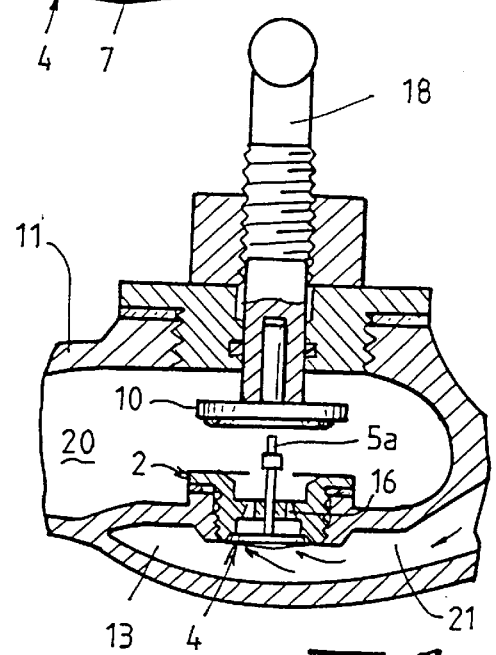

FIG. 5 details the principle purpose of the auxiliary valve (besides water conservation). The main tap valve member 10 is fully withdrawn such that the auxiliary valve member 4 engages the auxiliary valve seat member 3a to stop the fluid flow through the tap. The spindle and spindle bearing can now be removed from the tap to access the main valve member 10 which can then be subject to maintenance or replacement. The auxiliary valve member 4 in the meantime has substantially sealed off the fluid flow through the tap without the need to access mains supply taps or interrupt any other fluid supply other than the faulty tap. It may desirable in some situations to provide a less than perfect seal for the auxiliary valve so that drip occurs to avoid wear on the auxiliary valve during repair of a faulty main valve. Upon replacement of the main valve member, the spindle can be replaced into the tap body and when the spindle is rotated the main valve member engages the stem 5a of the auxiliary valve member and opens up the auxiliary valve to resume normal fluid flow through the tap. Further depression of the main valve member serves to turn off the tap in the usual manner.

The invention may also be fitted to ceramic valve taps which do not rely on the same type of action as conventional valve taps. In the example of ceramic valve taps, where the valve operates by rotation in a single plane, the auxiliary valve shall come into operation during maintenance when the spindle of the ceramic valved tap is removed and the ceramic valve is only then lifted up and made to "release" the auxiliary valve to close off the supply.

Numerous other embodiments of the instant invention are envisaged including auxiliary valves for retrofitting to existing taps and fully assembled taps in the form of a complete valve device incorporating the auxiliary valve. The mounting of the auxiliary valve member is herein before described as a bush held in the sleeve of the auxiliary valve with the main tap valve merely bearing down onto the shaft of the valve. However, other embodiments may include a fixed attachment of the main and auxiliary valves eliminating the need for an axial bush in the auxiliary valve.

The invention can be seen to provide a highly innovative and efficient auxiliary tap valve easily retrofitted to many existing taps to facilitate future maintenance of the taps.

Since modifications within the spirit and scope of the invention may be readily effected by persons skilled in the art, it is to be understood that the invention is not limited to the particular embodiment described, by way of example, hereinabove.

We claim:

1. An auxiliary tap valve insertable into a fluid flow path of a tap, said auxiliary tap valve comprising:

a sleeve body with an auxiliary valve seat member, said sleeve body having at least one constriction constructed and arranged to restrict fluid flow through said auxiliary tap valve; and an auxiliary valve member supported within said sleeve body and operatively connectable to a main valve member to move in response to movement of the main valve member between an open position, in which said auxiliary valve member is spaced from said auxiliary valve seat member to permit fluid to flow through said auxiliary tap valve, and a closed position, in which said auxiliary valve member engages said auxiliary valve seat member to close said auxiliary tap valve to fluid flow, said auxiliary valve member having first and second faces respectively facing downstream and upstream relative to fluid flow through said auxiliary valve member, said first face being substantially flat with a chamfered outer edge, said second face defining a conically shaped surface with an apex projecting upstream such that said second face has a substantially greater surface area exposed to fluid flow than said first face, wherein fluid flow through said constriction creates a pressure drop across said auxiliary valve member and consequential venturi effect, and wherein the venturi effect and lift created by fluid flow against surface areas defining said first and second faces collectively urge said auxiliary valve member toward the auxiliary valve seat member during fluid flow through said auxiliary valve member when said auxiliary valve member is in the open position to thereby reduce turbulence clatter.

2. An auxiliary tap valve according to claim 1, wherein said second face has a flat profile.

3. An auxiliary tap valve according to claim 1, wherein a portion of said sleeve body defines a spider with said constriction passing therethrough, said constriction being formed by one of a plurality of apertures formed in said spider, each of said apertures tapering from an upstream side of said spider to a downstream side of said spider.

4. An auxiliary tap valve according to claim 2, wherein a portion of said sleeve body defines a spider with said constriction passing therethrough, said constriction being formed by one of a plurality of apertures formed in said spider, each of said apertures tapering from an upstream side of said spider to a downstream side of said spider.

5. An auxiliary tap valve according to claim 1, wherein said auxiliary valve seat member has a chamfered portion complementary to said chamfered outer edge of said first face of said auxiliary valve member.

6. An auxiliary tap valve according to claim 1, wherein said auxiliary tap valve is retrofittable into a gate of a standard tap.

7. An auxiliary tap valve according to claim 1, wherein said auxiliary tap valve is an integral part of a gate of a standard tap.

8. An auxiliary tap valve insertable into a fluid flow path of a tap, said auxiliary tap valve comprising:
    a sleeve body with an auxiliary valve seat member, said sleeve body having at least one constriction constructed and arranged to restrict fluid flow through said auxiliary tap valve; and
    an auxiliary valve member supported within said sleeve body and operatively connectable to a main valve member to move in response to movement of the main valve member between an open position, in which said auxiliary valve member is spaced from said auxiliary valve seat member to permit fluid to flow through said auxiliary tap valve, and a closed position, in which said auxiliary valve member engages said auxiliary valve seat member to close said auxiliary tap valve to fluid flow, said auxiliary valve member having first and second faces respectively facing downstream and upstream relative to fluid flow through said auxiliary valve member, said first face being substantially flat with a chamfered outer edge, said second face defining a conically shaped surface with an apex projecting upstream such that said second face has a substantially greater surface area exposed to fluid flow than said first face,
    wherein fluid flow through said constriction creates a pressure drop across said auxiliary valve member and consequential venturi effect, and
    wherein the venturi effect and lift created by fluid flow against surface areas defining said first and second faces collectively urge said auxiliary valve member toward the auxiliary valve seat member during fluid flow through said auxiliary valve member when said auxiliary valve member is in the open position to thereby reduce turbulence clatter, and
    wherein a portion of said sleeve body defines a spider with said constriction passing therethrough, said constriction comprising at least two generally semi-circular apertures formed in said spider, each of said apertures tapering from an upstream side of said spider to a downstream side of said spider to collectively define a substantially coaxial fustro-conical opening bridged by a traversing bar.

9. An auxiliary tap valve according to claim 8, wherein said second face has a flat profile.

10. An auxiliary tap valve according to claim 8, wherein said auxiliary valve seat member has a chamfered portion complementary to said chamfered outer edge of said first face of said auxiliary valve member.

11. An auxiliary tap valve according to claim 8, wherein said auxiliary tap valve is retrofittable into a gate of a standard tap.

12. An auxiliary tap valve according to claim 8, wherein said auxiliary tap valve is an integral part of a gate of a standard tap.

13. An auxiliary tap valve insertable into a fluid flow path of a tap having a main valve, said auxiliary tap valve comprising:
    a sleeve body with an auxiliary valve seat member, said sleeve body having at least one constriction constructed and arranged to restrict fluid flow through said auxiliary tap valve; and
    an auxiliary valve member supported within said sleeve body and operatively connectable to a main valve member to move in response to movement of the main valve member between an open position, in which said auxiliary valve member is spaced from said auxiliary valve seat member to permit fluid to flow through said auxiliary tap valve, and a closed position, in which said auxiliary valve member engages said auxiliary valve seat member to close said auxiliary tap valve to fluid flow, said auxiliary valve member having first and second faces respectively facing downstream and upstream relative to fluid flow through said auxiliary valve member, said first face being substantially flat, said second face defining a conically shaped surface defined by a tapering wall extending from an outer circumferential edge of said second face to an upstream-projecting apex of said second face such that said second face has a substantially greater surface area exposed to fluid flow than said first face,
    wherein fluid flow through said constriction creates a pressure drop across said auxiliary valve member and consequential venturi effect, and
    wherein the venturi effect and lift created by fluid flow against surface areas defining said first and second faces collectively urge said auxiliary valve member toward the auxiliary valve seat member during fluid flow through said auxiliary valve member when said auxiliary valve member is in the open position to thereby reduce turbulence clatter.

* * * * *